April 16, 1968  C. E. LENZ  3,378,692
DIGITAL REFERENCE SOURCE
Filed Sept. 8, 1964  3 Sheets-Sheet 1

INVENTOR.
CHARLES E. LENZ
BY
ATTORNEY

April 16, 1968  C. E. LENZ  3,378,692
DIGITAL REFERENCE SOURCE
Filed Sept. 8, 1964  3 Sheets-Sheet 2

INVENTOR.
CHARLES E. LENZ
BY
ATTORNEY

United States Patent Office 3,378,692
Patented Apr. 16, 1968

3,378,692
DIGITAL REFERENCE SOURCE
Charles E. Lenz, Fullerton, Calif., assignor to North American Rockwell Corporation, a corporation of Delaware
Filed Sept. 8, 1964, Ser. No. 394,977
7 Claims. (Cl. 307—106)

ABSTRACT OF THE DISCLOSURE

A digital reference source providing a pair of square waves of equal period and controlled 90° phase relationship. A master oscillator produces a train of pulses at regularly spaced intervals. A counter counts the pulses and produces an output when a predetermined count has been reached. The counter output is ANDed with pulses from the clock to provide trigger pulses at regular predetermined intervals. A pair of flip-flops, responsive to the trigger pulses, are interconnected so that consecutive trigger pulses change the state of alternate flip-flops. The flip-flops provide square wave outputs, the leading and trailing edges of which are accurately synchronized with the clock pulses.

---

This invention relates to a waveform generator and more specifically to a generator for accurately producing square waves having both accurately controlled phase and frequency.

In digital systems and more specifically in digital servo control systems, square waves are employed for various functions. Many conventional square wave generators are unsatisfactory in high accuracy digital control systems due to the inaccurate or uncertain time occurence of the leading and trailing edges of these square waves. Hence, the accuracy of the entire digital servo system could be determined by such a square wave generator.

Accordingly, an object of the invention is to provide a new and improved square wave generator.

Another object of this invention is to provide logical square waves, directly from flip-flops of the reference source without intervening gates.

Still another object of this invention is to provide a means for assuring minimum delay in triggering a two-phase square wave reference source from a primary clock source.

Yet still another object of this invention is to provide a square wave reference source which does not utilize monostable logic elements.

A further object of the invention is a provision of a generator for accurately producing two square wave outputs.

A still further object of the invention is to provide a generator for producing square waves having accurately controlled leading and trailing edges with the effective noise and other outside factors being at a minimum.

A yet still further object of this invention is to provide a square wave generator for producing square waves having an accurately controlled phase relationship with respect to each other.

In order to accomplish the above objects, the present invention utilizes a high speed counter to count clock pulses from a source of clock pulses. When a true count of a predetermined number of pulses is achieved, a signal from the counter will be emitted to a gating circuit. When the predetermined relationship between this signal and another clock pulse occurs in the gating circuit, a triggering signal will be generated which will determine the time of the leading or trailing edge of the generated square waves. In so utilizing this counter, a square wave signal is accurately and precisely generated.

Further, the reference source incorporates a number of features which contribute to the simplicity, reliability, and accuracy of the digital control or other system with which it is associated. The clock period is controlled by a master crystal oscillator in such a manner that clock-pulse shaped and duration are independent of changes in oscillator waveform. A simple two-phase reference-carrier generator produces sine and cosine carriers without gating irregularities which cause analog waveform distortion and resultant control-system inaccuracy. Zero crossings of the reference carriers are automatically synchronized with the clock signals, reducing by one-half the uncertainty of measuring phase by asynchronous digital means. Proper sine- and cosine-carrier phasing is automatic, eliminating carrier-generator presetting either after power application or after a severe noise disturbance. Monostable elements have eliminated for noise immunity.

The previously mentioned objects and additional objects of the invention may be better understood by reference to the accompanying drawings, in which.

The digital reference source can supply all reference signals required by a digital position-control system of the phase-comparison type; moreover, the components used can be employed together or individually to supply reference signals for a variety of other types of digital systems. The specific nature of the reference signals generated and the means used to generate them have evolved from laboratory experience with less satisfactory approaches which ultimately led to the accurate and reliable components and methods to be described. The design of the reference source has led to both improvement in performance and reduction in complexity of digital systems with which it has been used.

Figure 1:
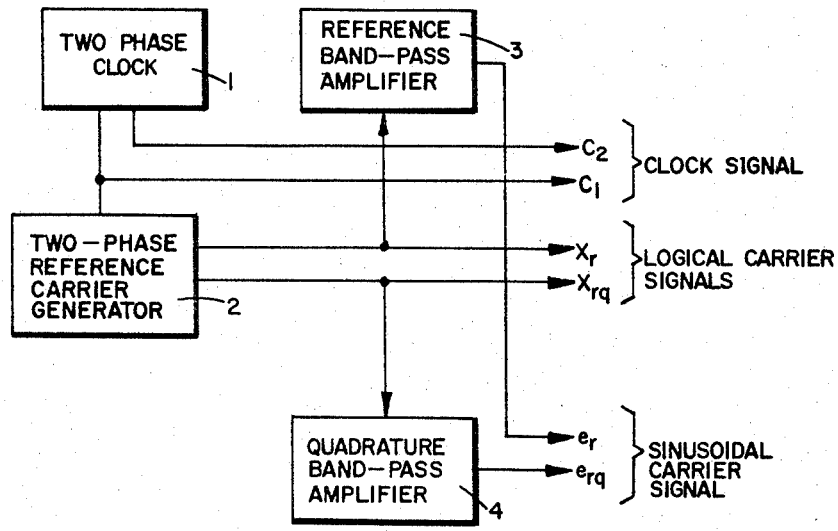
FIG. 1 is a block diagram of the digital reference source.

The block diagram of the digital reference source in FIG. 1 shows the two-phase clock 1 which furnishes the time base for the digital reference source. The clock 1 is synchronized by a crystal master oscillator 5, and illustrated in FIG. 2, which produces either a sinusoidal output of frequency $\omega_m$ or an arbitrary periodic output of the same fundamental frequency. The two-phase clock 1 produces two normally false output signals, $C_1$ and $C_2$, illustrated in FIG. 3e and f, each of duty cycle 0.25 and $\tau = 8\pi/\omega_m$. If the time scale is selected so that a pulse of the primary clock train $C_1$ terminates at $t=\tau$, then the first pulse of the second clock train $C_2$ for $t>0$ will terminature at $t=\tau/2$. The clock signals $C_1$ and $C_2$ are both directed to the associated digital control or other system; $C_1$ is also directed to the two-phase reference-carrier generator 2, as shown in FIG. 1. For a period $\tau/4$ after a pulse of either clock signal, $C_1C_2=0$; this time period is provided to permit the settling of flip-flops either for interrogation after triggering or for triggering after override presetting. Although the two clock signals can be used in various ways in an associated digital system, $C_1$ is normally employed for triggering flip-flops, while $C_2$ is used both for interrogation to determine the states of flip-flops after settling and for override resetting of flip-flops.

As shown in FIG. 1, the only input to the two-phase reference-carrier generator 2 is the clock signal $C_1$. Synchronized by this clock signal, the reference-carrier generator 2 produces two balanced square-wave carrier outputs, the logical reference carrier $X_r$ and the logical quadrature carrier $X_{rq}$. Both $X_r$ and $X_{rq}$ are of period $m_1\tau$, where the positive integer $m_1$ is divisible by 4 and is a design parameter of the reference-carrier generator 2. The signals $X_r$ and $X_{rq}$, shown in FIG. 4, go through all logical transitions in synchronism with the trailing edges of $C_1$ pulses. If the time scale is selected so that $X_r$ goes true (i.e., from 0 to 1) at $t=0$, then $X_r$ will have a 0-to-1 transition whenever $$t = pm_1\tau \tag{1}$$

where $p$ is any non-negative integer, and will have a 1-to-0 transition whenever $$t = (2p+1)m_1\tau/2 \tag{2}$$

Using the same time scale, $X_{rq}(0) = 1$ and $X_{rq}$ will have a 1-to-0 transition whenever $$t = (4p+1)m_1\tau/4 \tag{3}$$

and will have a 0-to-1 transition whenever $$t = (4p+3)m_1\tau/4 \tag{4}$$

If $X_r$ and $X_{rq}$ are passed through identical reference and quadrature band-pass amplifiers, 3 and 4 respectively, tuned to $\omega_r$, as shown in FIG. 1, then the respective output signals will be $$e_r = k_1 \sin \omega_r t \tag{5}$$

and $$e_{rq} = k_1 \cos \omega_r t \tag{6}$$

where $$k_1 = 2/\pi \tag{7}$$

for unity-gain amplifiers and unity peak-to-peak amplitude amplifier inputs. In this manner, two-phase sinusoidal signals are produced for use, for example, as inputs for a resolver-type output transducer of an associated digital control system connected to produce a constant-amplitude output with phase relative to the electrical angle of $e_r$ proportional to the shaft angle. If the reference and quadrature band-pass amplifiers, 3 and 4 respectively, in FIG. 1 are identical, the phase between $e_r$ and $e_{rq}$ is not dependent upon either the clock period $\tau$ or the frequency $\omega_m$ of the master oscillator 5 from which it is derived. In practice, this characteristic permits minor changes in oscillator frequency to be tolerated without phase error. The logical carrier signals $X_r$ and $X_{rq}$ can also be used directly as inputs for the logical section of an associated digital control or other system.

Normally no preset signals need be applied to the digital reference source, as the state of the source itself provides the reference for all measurements and presetting of states in the associated digital control or other system.

*Operation of components*

Figure 2:
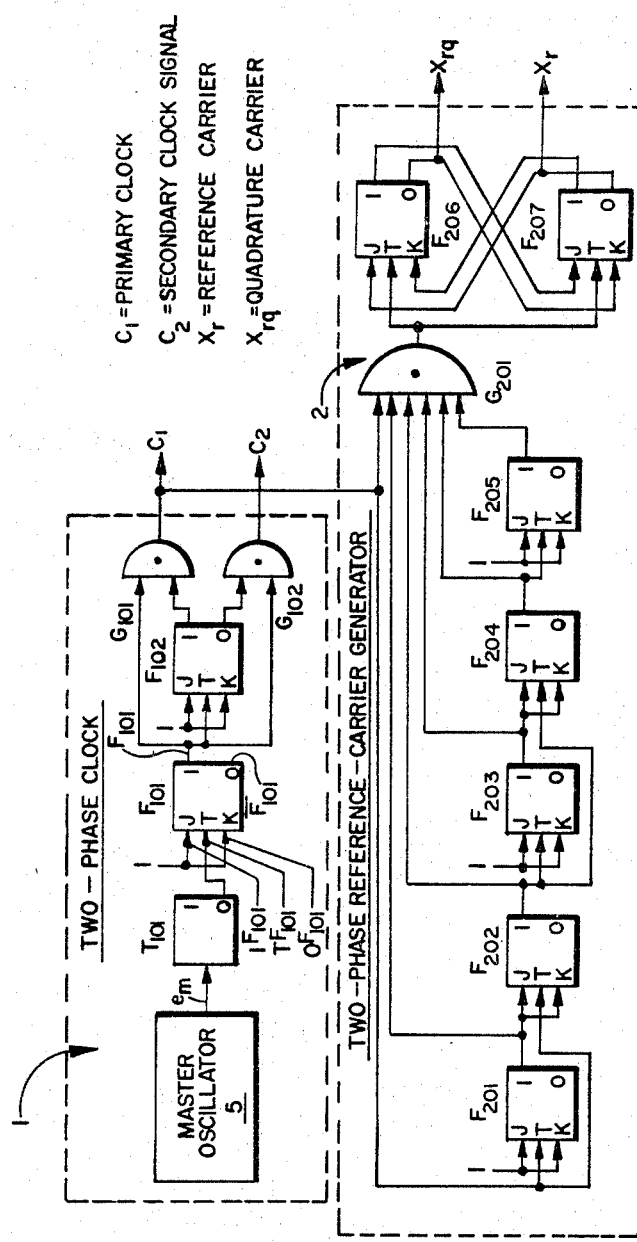
FIG. 2 is a logic diagram of the two-phase clock and the two-phase reference-carrier generator.

A logic diagram showing the unique components of the digital reference source appears in FIG. 2. The signals which are inputs to and outputs from the various components correspond to those shown in FIG. 1. The reference and quadrature band-pass amplifiers, 3 and 4 respectively, shown in FIG. 1 are of conventional design and do not appear in FIG. 2. (Ref. to Lloyd P. Hunter, Handbook of Semiconductor Electronics, pp. 12–14 thru 12–26; Arthur W. Lo et al., Transistor Electronics, pp. 310–335; and RCA Transistor Manual, pp. 29–33.)

Trailing-edge triggering whereby each flip-flop is responsive only to 1-to-0 transitions at its trigger input is assumed throughout FIG. 2. All flip-flops are of the clocked JK type. (Ref. to Montgomery Phister, Jr., Logical Design of Digital Computers, pp. 128–129, 134–135.) Symbols associated with the inputs and outputs of a typical flip-flop are defined as follows, wherein the subscript $a$ designates the specific flip-flop (e.g., $a=101$ refers to flip-flop $F_{101}$ in FIG. 2):

$1^{F_a}$ = set-enable (J) input of flip-flop $F_a$,
$T^{F_a}$ = clock or trigger (T) input of flip-flop $F_a$,
$0^{F_a}$ = reset-enable (K) input of flip-flop $F_a$,
$F_a$ = normal output of flip-flop $F_a$,
$\overline{F}_a$ = complement output of flip-flop $F_a$.

Figure 3:
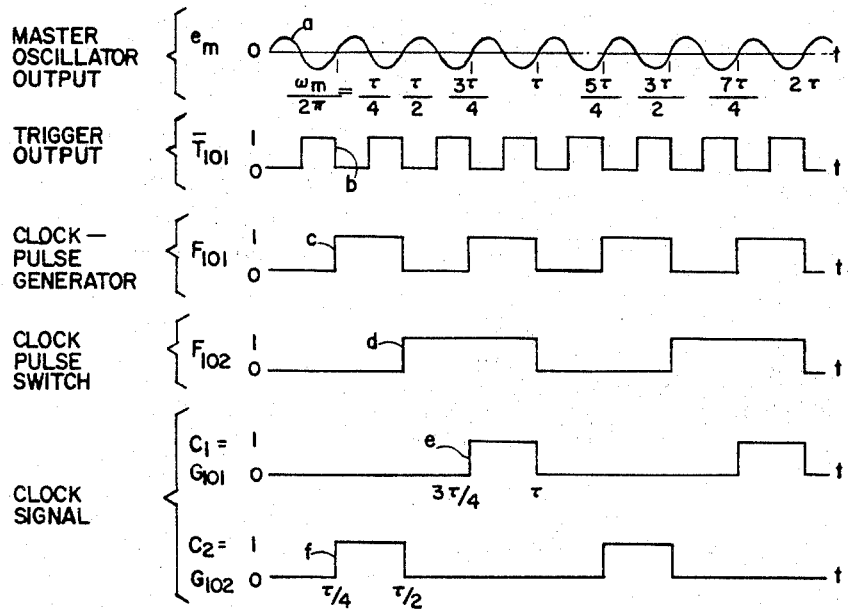
FIG. 3 illustrates the waveforms present throughout the two-phase clock.

The logic diagram of the two-phase clock 1 is illustrated in FIG. 2. Corresponding waveforms are shown in FIG. 3. In FIG. 3a, the sinusoidal wave $e_m$ is generated by the master oscillator 5, normally a crystal oscillator of conventional design (Ref. to Lloyd P. Hunter, op. cit., pp. 14–18 and 14–19; Arthur W. Lo et al., op. cit., pp. 366–377, 382–383; and RCA Transistor Manual, pp. 39–40) at an angular frequency $\omega_m$. The two-phase clock 1 functions by first producing a clock train of duty cycle 0.5 with a waveform independent of the waveform at the output of the master oscillator 5 and then directing alternate pulses to the output $C_1$ and $C_2$.

The master-oscillator output $e_m$ is converted to a square wave (shown in FIG. 3b) by the trigger $T_{101}$, which is connected to produce a false output ($\overline{T}_{101}=0$) when $e_m \geq 0$ and a true output ($\overline{T}_{101}=1$) when $e_m < 0$. The complement output of $T_{101}$ is connected to the trigger input of flip-flop $F_{101}$, which is arranged to toggle on each 1-to-0 transition of $\overline{T}_{101}$. The resultant output is shown in FIG. 3c. The signal $F_{101}$ is essentially the OR-function $C_1 + C_2$. It should be noted that the same waveform would be produced at $F_{101}$ for a variety of waveforms at $e_m$, as long as the angular frequency of the fundamental component of $e_m$ is $\omega_m$. This feature makes the waveforms of the outputs of the two-phase clock 1 independent of variations in the waveform of the output of the master oscillator 5 due to aging or environmental changes.

Once the clock-pulse train $F_{101}$ has been obtained, the problem of directing alternate pulses to outputs $C_1$ and $C_2$ of the two-phase clock 1 remains. This operation is accomplished by the clock-pulse switch $F_{102}$ in conjunction with the AND-gates $G_{101}$ and $G_{102}$. The trigger input of $F_{102}$ is connected to the true output of $F_{101}$, and $F_{102}$ is arranged to toggle in response to each 1-to-0 transition of $F_{101}$. The resultant waveform $F_{102}$ is shown in FIG. 3d. The true and complement outputs of $F_{102}$ are directed to gates $G_{101}$ and $G_{102}$, respectively, and the clock-pulse train $F_{101}$ is also directed to each of these gates. The resultant outputs $G_{101}$, shown in FIG. 3e, and $G_{102}$, shown in FIG. 3f, are the required primary and secondary clock signals $C_1$ and $C_2$, respectively.

Operation of the two-phase clock 1 is governed by the following logic equations:

$$1^{F_{101}} = 1, \tag{8a}$$
$$T^{F_{101}} = \overline{T}_{101}, \quad \text{Flip-flop } F_{101} \text{ input equations} \tag{8b}$$
$$0^{F_{101}} = 1 \tag{8c}$$

$$1^{F_{102}} = 1, \tag{9a}$$
$$T^{F_{102}} = F_{101}, \quad \text{Flip-flop } F_{102} \text{ input equations} \tag{9b}$$
$$0^{F_{102}} = 1, \tag{9c}$$

$$G_{101} = F_{101} F_{102}, \tag{10}$$
$$G_{102} = F_{101} \overline{F}_{102}, \quad \text{Gate equations} \tag{11}$$

$$T_{101} = \begin{matrix} 0, & e_m < 0, \\ 1, & e_m \geq 0, \end{matrix} \quad \text{Trigger equations} \tag{12a, 12b}$$

$$C_1 = G_{101}, \tag{13}$$
$$C_2 = G_{102}, \quad \text{Output equations} \tag{14}$$

The preceding equations are implemented in the logic diagram shown in FIG. 2.

The purpose of the two-phase reference-carrier generator 2, is to produce the logical reference carrier $X_r$ and the logical quadrature carrier $X_{rq}$ having, respectively, the fundamental sinusoidal components $$e_r = k_1 \sin \omega_r t \quad (15)$$

and $$e_{rq} = k_1 \cos \omega_r t \quad (16)$$

The signals $e_r$ and $e_{rq}$ must be generated in such a manner that $$\omega_r = 2\pi m_1/\tau \quad (17)$$

where $m_1$ is a design parameter of the reference-carrier generator 2 and $\tau$ is the clock period, and in such a manner that each transition of $X_r$ and $X_{rq}$ is in synchronization with a 1-to-0 transition of $C_1$.

The logic diagram of the two-phase reference-carrier generator 2 is shown in FIG. 2. The reference-carrier generator 2 consists essentially of two sections: a high-speed doublet counter composed of flip-flops $F_{201}$ thru $F_{205}$, and a two-phase output stage composed of flip-flops $F_{206}$ and $F_{207}$. The gate $G_{201}$ triggers the output stage every time the preceding counter assumes a predetermined state.

It is useful to consider the state of the set of flip-flops forming the two-phase reference-carrier generator 2 to represent a binary number or count $C_r$. This number may be defined as $$C_r = \sum_{k=0}^{6} a_k 2^k \quad (18)$$

where $$a_k = F_{k+201}, \quad 0 \leq k \leq 4, \; k = 6 \quad (19a)$$

and $$a_5 = F_{206}\overline{F}_{207} + \overline{F}_{206}F_{207} \quad (19b)$$

The efficiency of the design of the two-phase reference-carrier generator 2 is demonstrated by the fact that every state of the set of flip-flops used is employed.

Although the counter shown in FIG. 2 consists of two doublets ($F_{201}-F_{202}$ and $F_{203}-F_{204}$) and an independent flip-flop ($F_{205}$), any number of stages can be assembled by employing the same type of counter configuration, using doublets exclusively if an even number of stages is needed or adding a separate flip-flop if an odd number of stages is required. The doublet shown is an efficient logical design since it utilizes no more logic elements than a two-stage ripple counter but has only half the delay.

The design parameter $m_1$ referred to earlier, which may also be considered to be the interpolation ratio for an associated digital control system, is defined by the relationship $$m_1 = 2^j \quad (20)$$

where $j$ equals the number of flip-flops in the two-phase reference-carrier generator 2, including the two output flip-flops. The parameter $m_1$ is also the ratio of the reference-carrier period to the clock period. The smallest possible value of $j$ in Relation 20 is 2, corresponding to direct injection of the clock signal $C_1$ into the trigger inputs of the two output stages. In the example being considered here, $j=7$, yielding $m_1=128$.

The first doublet in FIG. 2, $F_{201}-F_{202}$, is typical. Flip-flop $F_{201}$ is connected to be triggered by each 1-to-0 transition of its input $C_1$, while $F_{202}$ is connected to be triggered by a 1-to-0 transition of $C_1$ only when $F_{201}=1$. Thus, $F_{201}$ and $F_{202}$ together form a two-stage cyclic counter capable of counting from $00_2$ to $11_2$. Since the same trigger input is applied to both flip-flops, there is no ripple delay in response of $F_{202}$ to a 1-to-0 transition of $C_1$. The connection of flip-flops $F_{203}$ and $F_{204}$ is identical to that of $F_{201}$ and $F_{202}$, except that the trigger input to both $F_{203}$ and $F_{204}$ is $F_{202}$ instead of $C_1$. Consequently, $F_{201}$ thru $F_{204}$ together form a four-stage cyclic counter capable of counting from $0000_2$ to $1111_2$ with only approximately half of the settling delay associated with a ripple counter of the same capacity. Due to the odd number of counter stages required in the base being considered, an independent flip-flop, $F_{205}$, is used at the end of the counter. This flip-flop is connected to toggle in response to each 1-to-0 transition of $F_{204}$.

The AND-gate $G_{201}$ receives an input from the normal output of each of the flip-flops $F_{201}$ thru $F_{205}$. The clock signal $C_1$ is an additional input. Consequently, one $C_1$ pulse is emitted by $G_{201}$ each time $C_r = a_6 a_5 11111$, where $a_6$ and $a_5$ can have the values 0 and 1 in any combination. This gate eliminates the delay between the trailing edge of a $C_1$ pulse which occurs when $C_r = a_6 a_5 11111$ ($a_6 a_5$ again having any value) and the resultant transition of $F_{205}$ from 1 to 0. Although this delay is normally small, it may be of significance when the number of stages in the carrier generator 2 is relatively large and the associated digital control or other system must provide high accuracy. The delay avoided may vary somewhat with environment and component aging.

The output stage of the two-phase reference-carrier generator 2 consists of the two flip-flops $F_{206}$ and $F_{207}$. Each of these flip-flops receives its trigger input directly from $G_{201}$. The logical reference carrier $X_r$ is the complement output $\overline{F}_{207}$, while the logical quadrature carrier $X_{rq}$ is complement output $\overline{F}_{206}$. The flip-flops $F_{206}$ and $F_{207}$ are connected as shown in FIG. 2 so that each supplies the enabling inputs for the other in such a manner that the proper phase relationship always exists between the fundamental sinusoidal components of $X_r$ and $X_{rq}$. The particular logic configuration employed permits each carrier output of the reference-carrier generator 2 to be obtained directly from a flip-flop, thus avoiding the necessity for additional gates and the switching transients sometimes encountered when intervening gates are employed. Switching transients are particularly undesirable when the analog nature of a logical signal is important, as is the case here. Should the state of either output flip-flop be disturbed by noise, the proper phase relationship between $X_r$ and $X_{rq}$ will automatically continue; this characteristic also makes presetting of $F_{206}$ and $F_{207}$ unnecessary when power is applied to the reference-carrier generator 2.

Operation of the two-phase reference-carrier generator 2 is governed by the following logic equations:

$$1^{F_{201}} = 1, \quad (21a)$$
$$T^{F_{201}} = C_1, \quad \text{Flip-flop } F_{201} \text{ input equations} \quad (21b)$$
$$0^{F_{201}} = 1, \quad (21c)$$

$$1^{F_{202}} = F_{201}, \quad (22a)$$
$$T^{F_{202}} = C_1, \quad \text{Flip-flop } F_{202} \text{ input equations} \quad (22b)$$
$$0^{F_{202}} = F_{201}, \quad (22c)$$

$$1^{F_{203}} = 1, \quad (23a)$$
$$T^{F_{203}} = F_{202}, \quad \text{Flip-flop } F_{203} \text{ input equations} \quad (23b)$$
$$0^{F_{203}} = 1, \quad (23c)$$

$$1^{F_{204}} = F_{203}, \quad (24a)$$
$$T^{F_{204}} = F_{202}, \quad \text{Flip-flop } F_{204} \text{ input equations} \quad (24b)$$
$$0^{F_{204}} = F_{203}, \quad (24c)$$

$$1^{F_{205}} = 1, \quad (25a)$$
$$T^{F_{205}} = F_{204}, \quad \text{Flip flop } F_{205} \text{ input equations} \quad (25b)$$
$$0^{F_{205}} = 1, \quad (25c)$$

$$1^{F_{206}} = \overline{F}_{207}, \quad (26a)$$
$$T^{F_{206}} = G_{201}, \quad \text{Flip-flop } F_{206} \text{ input equations} \quad (26b)$$
$$0^{F_{206}} = F_{207}, \quad (26c)$$

$$1^{F_{207}} = F_{206},$$  (27a)

$$T^{F_{207}} = F_{201},$$ Flip flop $F_{207}$ input equations  (27b)

$$O^{F_{207}} = \overline{F}_{206},$$  (27c)

$$G_{201} = C_1 F_{201} F_{202} F_{203} F_{204} F_{205},\} \text{ Gate equation}$$  (28)

$$X_r = \overline{F}_{207},$$  (29)
$$X_{rq} = \overline{F}_{206}.\}  \text{ Output equations}$$  (30)

The preceding equations are implemented in the logic diagram shown in FIG. 2.

Figure 4:
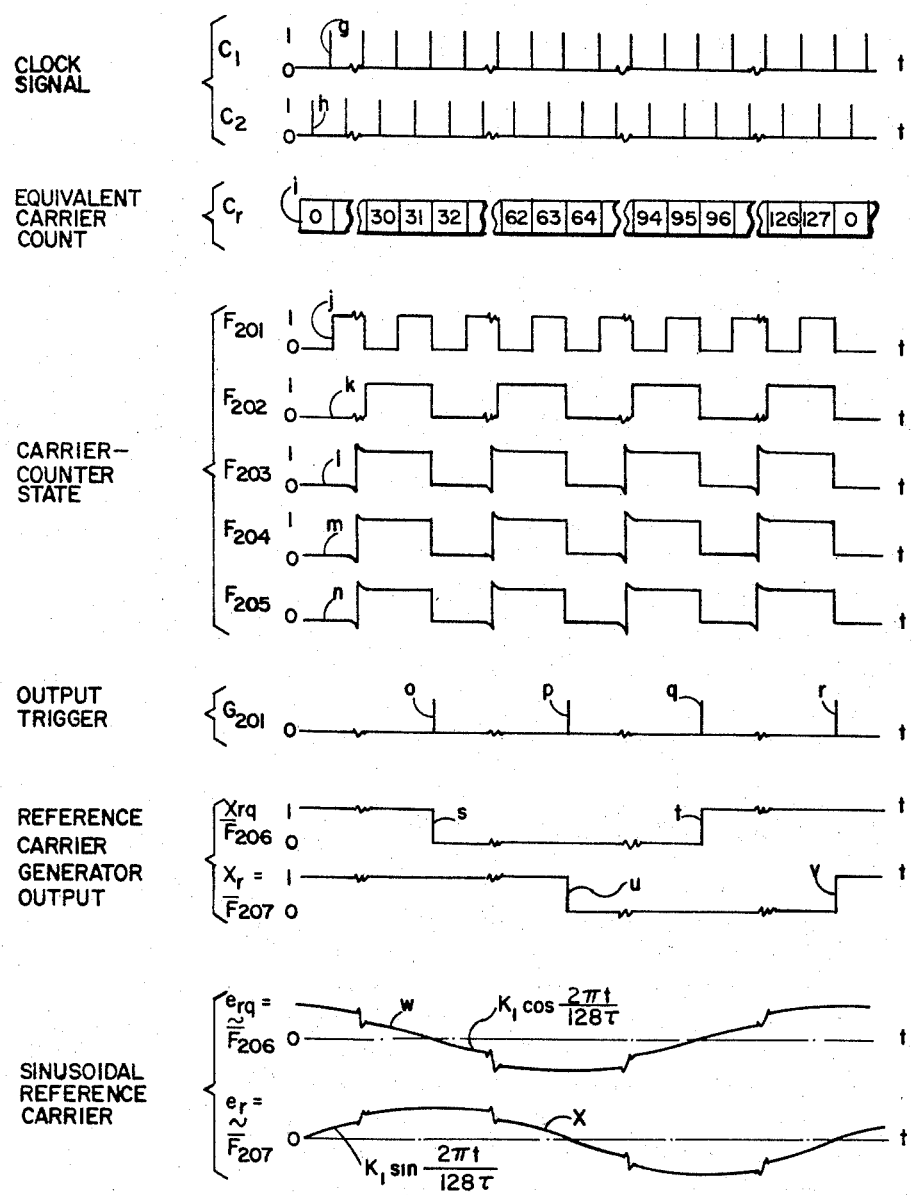
FIG. 4 illustrates the waveforms present through the two-phase reference-carrier generator.

Waveforms relating to the reference-carrier generator 2 appear in FIG. 4. The clock signals $C_1$ at $g$ and $C_2$ at $h$ are shown idealized as impulse trains. Lapses in the time scale are shown by jagged discontinuities; a particular signal may or may not vary during such a time lapse. The time scale has been selected so that $$e_r(0) = 0 > \dot{e}_r(0)$$

The number $C_r$ represented by the states of the flip-flops in the reference-carrier generator 2 is shown as defined in Relation 18. In the period shown, $C_r$ is initially 0 and increases one increment in response to each $C_1$ pulse until $C_r = 127_{10}$; $C_r$ then returns to 0 in response to the next $C_1$ pulse and the counting cycle repeats.

Waveforms are shown ($j$ thru $n$) which represent the states of all flip-flops ($F_{201}$ thru $F_{205}$) in the input counter of the reference-carrier generator. The states of these flip-flops represent the binary coefficients $a_k (0 \leq k \leq 4)$ of the number $C_r$ in accordance with Relation 19a.

Whenever $C_r = a_6 a_5 11111$, where $a_6$ and $a_5$ have the values 0 or 1 in any combination, the corresponding decimal value of $C_r$ will be 31, 63, 95, or 127. The $C_1$ pulse at the end of a clock period during which $C_r$ has any of these values will be emitted by the gate $G_{201}$, as shown at $0$ thru $r$. If, and only if, immediately preceding such a $G_{201}$ pulse $\overline{F}_{206} \overline{F}_{207}$ (or $F_{206} F_{207}$) = 1 (as at $o$ or $q$), a 1-to-0 (or 0-to-1) transition of $X_{rq} = \overline{F}_{206}$ will occur when the $G_{201}$ pulse terminates (as at $s$ or $t$). Similarly, if, and only if, immediately preceding a $G_{201}$ pulse $F_{206} \overline{F}_{207}$ (or $\overline{F}_{206} F_{207}$) = 1 (as at $p$ or $r$), a 1-to-0 (or 0-to-1) transition of $X_r = \overline{F}_{207}$ will occur when the $G_{201}$ pulse terminates (as at $u$ or $r$). This action results in generation of the logical two-phase carriers $X_r$ and $X_{rq}$ with the proper phase relationship at all times. The respective fundamental sinusoidal components of these two logical carriers are shown at $w$ and $x$, as they emerge from the reference and quadrature band-pass amplifiers (3 and 4 in FIG. 1).

In summary, the following advantages will be seen to have been achieved by the invention:

The availability of separate pulse trains for triggering flip-flops and for interrogation and presetting of flip-flop states which results in substantially greater versatility of the logical design.

The reliable settling of all flip-flops to new states before interrogation and more reliable override presetting of flip-flops independent of the succeeding clock pulse, which results in the elimination of extraneous interrogation-signal spikes which in turn lead to unreliable operation and the necessity of introducing intentional delays to remove such spikes.

The reliable operation under variation of operating environment and aging which may affect the output wave form of the master oscillator.

The reduction of uncertainty in measurement of the phase displacement between the reference carrier square wave and a phase shifted carrier sine or square wave from the output transducer of an associated control system.

The frequency drift due to varying environment or aging does not produce the phase errors which result when phase shift is produced by the conventional method of resistance-capacitance networks.

The elimination of gating irregularities at the output which results in a purer fundamental wave form after filtering, and also provides greater measurement accuracy in the associated system.

The method of obtaining the two-phase square waves with the elimination of all except momentary improper phasing and of the necessity for presetting flip-flops to obtain proper phasing.

The additional method of having all logical transitions synchronized by the master oscillator directly which results in greater reliability of operation.

While in order to comply with the statute the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. A digital reference source combining in combination:

a clock means for generating a periodic pulse train;
a carrier generator for generating first and second square waves separated in phase a fixed predetermined amount from each other and having a frequency dependent upon said periodic pulse train, the periods of said first and second square waves being of equal duration, said generator comprising, a high speed counter for counting said pulse train and for supplying a signal indicative of said counted pulses, gate means for producing a trigger pulse each time said supplied signal and said pulse train assume a predetermined state, a pair of flip-flops each connected to receive as inputs said trigger pulse and to provide an output when in one state, said flip-flops connected so that each supplies the enable inputs for the other, whereby consecutive trigger pulses change the state of alternate flip-flops.

2. A digital reference source combining in combination:

clock means for generating a periodic pulse train;
a carrier generator for generating two square waves each having equal periods and a frequency dependent upon said pulse train, said generator comprising, a high speed doublet counter for counting said pulse train and for supplying a signal indicative of said counted pulses, gate means for producing an output trigger pulse each time said supplied signal and said pulse train assume a predetermined state, a pair of bistable means responsive to said trigger pulses, each bistable means providing an output when in one state, said pair of bistable means being connected so that alternate ones of the pair are changed in state in coincidence with consecutive trigger pulses.

3. A reference source combining in combination:
means for generating a pulse train;
a generator for generating two balanced square waves shifted in phase by 90° and having a frequency dependent upon said pulse train, said generator comprising, a high speed doublet counter for counting said pulse train and for supplying a signal indicative of said counted pulses, means for producing an output pulse each time said supplied signal and said pulse train assume a predetermined state, a pair of bistable means each responsive to said output pulses, said pair being connected such that each supplies the enable inputs for the other, whereby each bistable means is changed in state in coincidence with alternate output pulses.

4. A source combining in combination:
means for generating a plurality of pulses forming a pulse train;

a generator for generating two square waves of equal period and shifted in phase by 90° and having a frequency dependent upon said pulse train, said generator comprising a high speed counter for counting said pulse train and for supplying a signal after counting a predetermined number of said pulses, gate means for producing an output trigger pulse upon time coincidence of said signal and one of said pulses, a pair of complimentary bistable means connected such that each supplies the enable inputs for the other, so that each means is responsive to alternate trigger pulses to produce as an output a square wave having rise and fall times coincident with pulses in said pulse train.

5. A square wave generator comprising in combination:
a source of control pulses;
counting means for counting said pulses;
gate means for producing a trigger pulse after a predetermined number of said pulses have been counted, said trigger pulse being coincident with one of said control pulses, a complimentary pair of bistable means each responsive to alternate trigger pulses so as to shift from one stable state to another stable state in coincidence with said alternate trigger pulses, said pair thereby producing as outputs a pair of balanced square waves having a frequency dependent upon said control pulses.

6. The device as claimed in claim 5 and further comprising:
a first filter means connected to the output of one of said bistable means for filtering out all but the fundamental frequency of said square wave to provide a first sinusoidal wave;
a second filter means connected to the output of the other of said bistable means for filtering out all but the fundamental frequency of said square wave to provide a second sinusoidal wave having a fixed phase relationship with respect to said first sinusoidal wave.

7. The device as claimed in claim 5 wherein said clock means is comprised of an oscillator means for producing a first fixed frequency signal, trigger means for providing a two state signal the state of which is dependent upon the predetermined transition of said first signal, a flip-flop connected to detect the state of said two state signal and for providing a second signal indicative of one of said states, a pulse switch for providing complementary output signals proportional to said second signal, a pair of gating means having as a common input the output of said flip-flop, one of said gating means having as another input one of said complemented signals and the other of said gating means having as an input the other of said complemented signals, so that the output from said gates in a series of pulses having a frequency proportional to said oscillator frequency and displaced in phase with respect to each other by 90°.

References Cited
UNITED STATES PATENTS

| | | | |
|---|---|---|---|
| 2,755,440 | 7/1956 | Andresen et al. | 318—171 XR |
| 2,910,586 | 10/1959 | Kohler | 328—155 |
| 3,172,042 | 3/1965 | Dawirs | 328—30 XR |
| 3,297,952 | 1/1967 | Thylander | 328—63 XR |
| 3,307,092 | 2/1967 | Trocchio | 318—171 |
| 3,312,885 | 4/1967 | Falk et al. | 318—171 |

MILTON O. HIRSHFIELD, *Primary Examiner.*

D. F. DUGGAN, *Assistant Examiner.*